US012138672B2

(12) United States Patent
Robb et al.

(10) Patent No.: US 12,138,672 B2
(45) Date of Patent: Nov. 12, 2024

(54) PROJECTILE LAUNCHER

(71) Applicant: DiversiTech Corporation, Duluth, GA (US)

(72) Inventors: Tim Robb, Stamford, CT (US); Michael Hardy, Stamford, CT (US); Victor Ceci, Stamford, CT (US); Steve Bitondo, Stamford, CT (US); Joseph Franzino, Stamford, CT (US)

(73) Assignee: DiversiTech Corporation, Duluth, GA (US)

( * ) Notice: Subject to any disclaimer, the term of this patent is extended or adjusted under 35 U.S.C. 154(b) by 407 days.

(21) Appl. No.: 17/556,145

(22) Filed: Dec. 20, 2021

(65) Prior Publication Data

US 2022/0118488 A1 Apr. 21, 2022

Related U.S. Application Data

(62) Division of application No. 17/074,869, filed on Oct. 20, 2020, now Pat. No. 11,203,047.

(51) Int. Cl.
*B08B 9/055* (2006.01)
*B08B 13/00* (2006.01)
*F41B 11/87* (2013.01)

(52) U.S. Cl.
CPC .......... *B08B 9/0558* (2013.01); *B08B 9/0551* (2013.01); *B08B 9/0553* (2013.01);
(Continued)

(58) Field of Classification Search
CPC ... B08B 9/0558; B08B 9/0551; B08B 9/0553; F41B 11/87
See application file for complete search history.

(56) References Cited

U.S. PATENT DOCUMENTS 1,867,751 A * 7/1932 Oberhuber ................ F28G 1/12 124/70
3,631,555 A * 1/1972 Hurst ........................ F28G 1/12 15/104.062

(Continued)

FOREIGN PATENT DOCUMENTS

CN 105710094 A * 6/2016
CN 111014177 4/2020

(Continued)

OTHER PUBLICATIONS

DE-4223054-A1—English Machine Translation (Year: 1994).*

(Continued)

*Primary Examiner* — Marc Carlson
(74) *Attorney, Agent, or Firm* — Dentons US LLP

(57) ABSTRACT

A projectile launching apparatus for cleaning the inner surface of a tube by forcing a projectile through the tube, comprising: a main body containing a breech chamber terminating in an exit port, wherein the breech chamber is provided with a loading port in a side thereof for radially loading a projectile into the breech chamber; a slide disposed on an exterior surface of the main body, the slide being axially movable between a first position wherein the loading port is exposed for loading of a projectile into the breech chamber and a second position wherein the loading port and the breech chamber are sealed; a gas gun operatively connected to the main body in pneumatic communication with the breech chamber; and an exit nozzle connected to the exit port and being connectable to a first end of the tube to be cleaned.

19 Claims, 6 Drawing Sheets

(52) U.S. Cl.
CPC .............. *B08B 13/00* (2013.01); *F41B 11/87* (2013.01); *B08B 2209/055* (2013.01)

(56) References Cited

U.S. PATENT DOCUMENTS

| | | | | | |
|---|---|---|---|---|---|
| 4,252,255 | A * | 2/1981 | Henderson | B29B 7/7438 | 222/149 |
| 4,467,488 | A * | 8/1984 | Creek | F28G 1/12 | 15/104.062 |
| 4,974,277 | A * | 12/1990 | Casella | B05B 1/005 | 15/104.062 |
| 5,103,524 | A * | 4/1992 | Vowles | B08B 9/0556 | 165/95 |
| 5,139,576 | A * | 8/1992 | Davis | F16L 55/46 | 15/104.062 |
| 5,329,660 | A * | 7/1994 | Fowler | B08B 9/055 | 15/104.062 |
| 5,448,795 | A * | 9/1995 | Boughal | B08B 9/0322 | 15/406 |
| 5,542,406 | A * | 8/1996 | Oneto | F41B 11/62 | 124/71 |
| 5,586,545 | A * | 12/1996 | McCaslin | F41B 11/62 | 124/71 |
| 5,771,875 | A * | 6/1998 | Sullivan | F41B 11/54 | 124/72 |
| 6,569,255 | B2 * | 5/2003 | Sivacoe | B08B 9/0553 | 134/8 |
| 6,631,531 | B1 * | 10/2003 | Franzino | B08B 9/0551 | 15/104.062 |
| 7,698,769 | B2 * | 4/2010 | Walters | B08B 9/0551 | 15/3.51 |
| 7,712,463 | B2 * | 5/2010 | Quinn | F41B 11/721 | 124/75 |
| 8,146,193 | B1 * | 4/2012 | Franzino | F28G 1/12 | 124/75 |
| 8,596,255 | B2 * | 12/2013 | Meggs | F42B 6/10 | 124/56 |
| 9,297,608 | B1 * | 3/2016 | Ma | F41B 11/642 | |
| 9,605,924 | B1 * | 3/2017 | McCaslin | F41A 3/72 | |
| 11,203,047 | B1 * | 12/2021 | Robb | B08B 9/0553 | |
| 2003/0000511 | A1 * | 1/2003 | Moritz | F41B 11/57 | 124/73 |
| 2003/0024520 | A1 * | 2/2003 | Dobbins | F41B 11/722 | 124/73 |
| 2003/0079731 | A1 * | 5/2003 | Dobbins | F41B 11/71 | 124/76 |
| 2006/0179588 | A1 * | 8/2006 | Walters | B08B 9/0551 | 15/3.51 |
| 2009/0032003 | A1 * | 2/2009 | Masse | F41B 11/721 | 124/73 |
| 2011/0114072 | A1 * | 5/2011 | Halmone | F41B 11/721 | 124/71 |
| 2013/0180513 | A1 * | 7/2013 | Foeller | F41B 1/00 | 124/62 |
| 2022/0106519 | A1 * | 4/2022 | Allred, Jr. | C09K 8/524 | |
| 2022/0118488 | A1 * | 4/2022 | Robb | B08B 9/0553 | |

FOREIGN PATENT DOCUMENTS

| | | | | |
|---|---|---|---|---|
| DE | 4223054 | | 1/1994 | |
| DE | 4223054 | A1 * | 1/1994 | B05B 7/1404 |
| EP | 1793166 | A1 * | 6/2007 | B08B 7/0007 |
| WO | WO-9202310 | A1 * | 2/1992 | |
| WO | WO-9618465 | A1 * | 6/1996 | B08B 9/055 |
| WO | WO-0161227 | A1 * | 8/2001 | B08B 9/0551 |
| WO | WO-2014205313 | A2 * | 12/2014 | F41B 11/51 |

OTHER PUBLICATIONS

Europe Search Report dated Mar. 17, 2022 in related Application 21203693.3 filed Oct. 20, 2021 (8 pages).

Taiwan Office Action dated Jun. 6, 2022 in related Application 110138871 filed Oct. 20, 2021 (16 pages).

* cited by examiner

FIG. 7
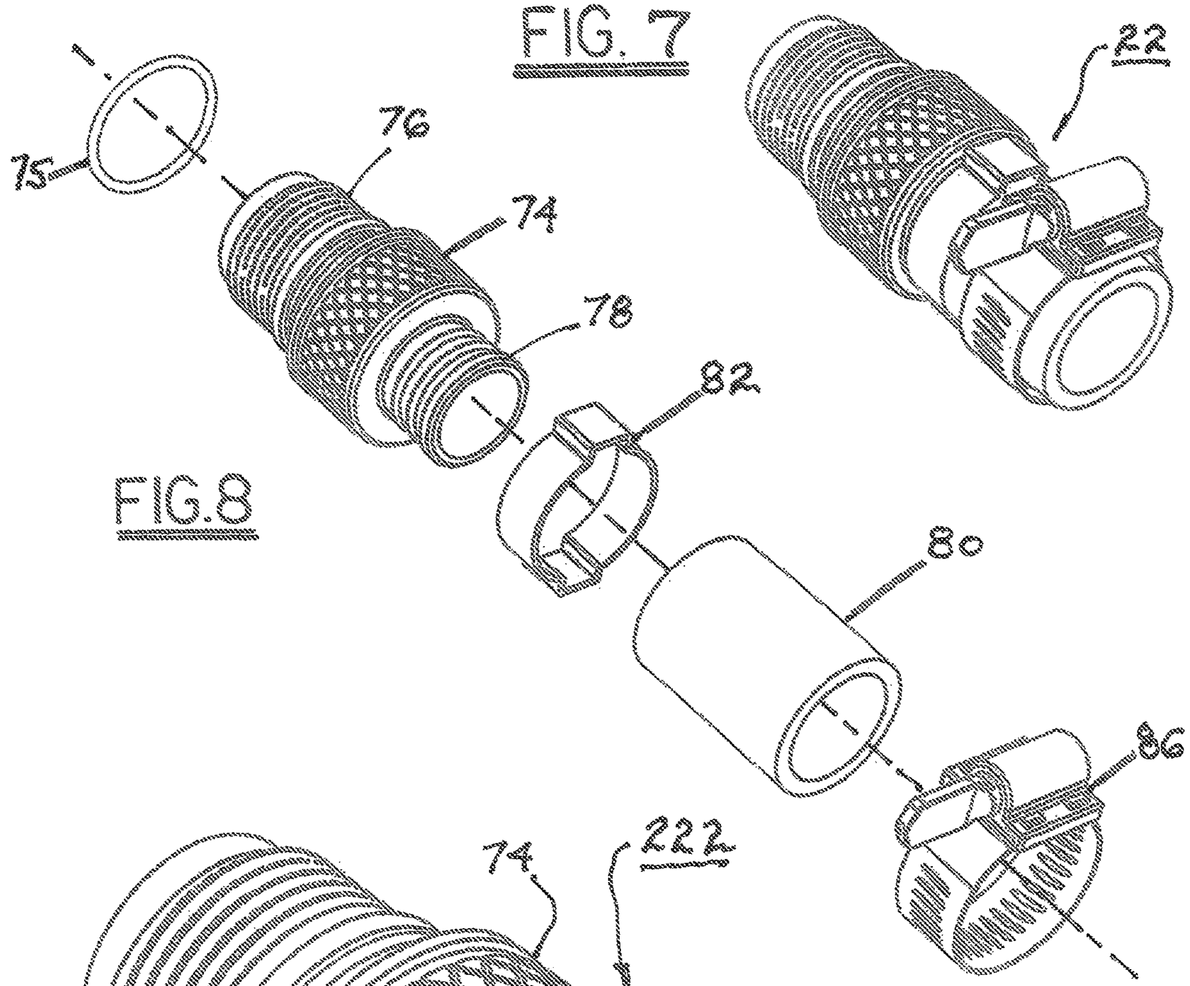
FIG.8
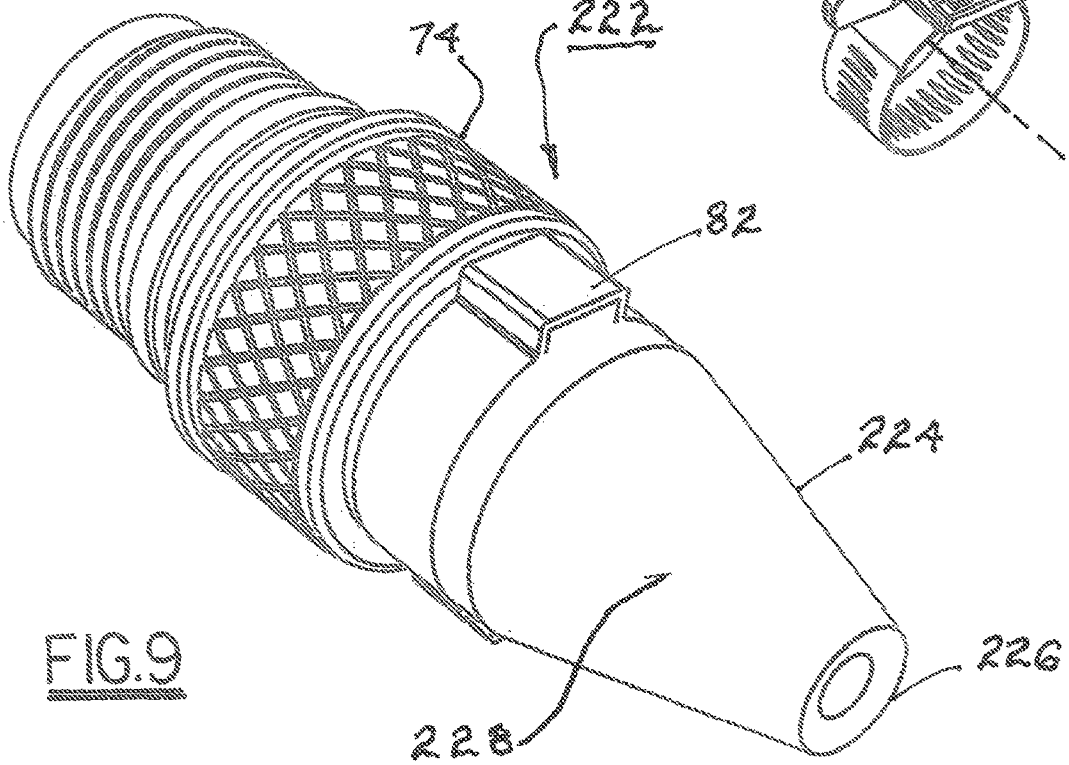
FIG.9

PROJECTILE LAUNCHER

CROSS REFERENCE TO RELATED PATENT APPLICATION

This patent application is a divisional of U.S. patent application Ser. No. 17/074,869 filed 20 Oct. 2020; which is herein incorporated by reference for all purposes.

TECHNICAL FIELD

The present invention relates to apparatus and methods for firing a projectile; more particularly, to such apparatus and methods for injecting a cleaning projectile into a tube for cleaning the internal walls of the tube; and most particularly, to apparatus and methods for cleaning conduits by propelling a foam projectile through the conduit by means of a compressed gas charge.

BACKGROUND

This disclosure relates to tube cleaning and particularly to propelling foam pellets by compressed gas through hydraulic hose, tubes, piping, conduits, and the like for cleaning interior surfaces thereof. The compressed gas used here is preferably chosen from any regularly available gases and mixtures thereof, including but not limited to air, nitrogen, carbon dioxide, argon, and/or helium.

Compressed gas-propelled foam pellets or projectiles are used for cleaning the interior surface of a variety of conduits including hydraulic and pneumatic lines wherein the foam projectile removes particulate matter, wipes the interior wall, and absorbs surface film. Preferably, for effective cleaning of the interior wall, the projectile is compressible, and its outer diameter is greater than the conduit bore diameter. The projectile acts as a seal against the interior wall such that the full force of the compressed gas is able to move the projectile through a conduit.

Foam projectiles are available in a range of diameters for use in cleaning conduits in a corresponding range of diameters. Foam projectiles are especially useful in applications wherein the tubing to be cleaned has a plurality of sharp bends as in an air handling system or air conditioner.

Handheld pneumatic guns of the type described in U.S. Pat. No. 4,974,277 are used to position a projectile for entry into a conduit, and to propel the projectile through the conduit with compressed gas. A pneumatic gun of this type includes interchangeable nozzles in different sizes to accommodate different size projectiles for application over a range of conduit diameters. The pneumatic gun includes a pivoting breech ring for interchanging nozzles and for hand loading projectiles one-by-one into the nozzle. In a first position, the breech ring pivots open for breech loading of a projectile into the gun nozzle. The breech ring is then closed manually. By positioning the gun muzzle adjacent a conduit opening and pulling the trigger, an operator can fire a compressed gas charge that propels the projectile through the conduit. When the projectile passes through the conduit, the compressed gas charge is completely dissipated. This loading and firing sequence are repeated for each projectile loaded into the pneumatic gun. The steps of opening and closing a pneumatic gun breech for each projectile adds to the complexity and time consumed for completing a conduit cleaning work schedule. In the event a conduit is obstructed or blocked and the projectile travels into but not through a conduit, the compressed gas charge is not dissipated and acts to force the air gun violently away from the conduit opening. Thus, the potential for obstructed conduits presents a safety hazard for an air gun operator and creates a need for fail-safe dissipation of compressed gas charges in these circumstances.

U.S. Pat. No. 6,631,531, incorporated herein by reference, discloses a pneumatic air gun for conduit cleaning with foam projectiles, comprising a hand grip with actuating trigger, projectile loading chamber with a quick load port, a nozzle, and a compressed gas circuit including an air flow control valve for directing air in propelling a projectile and for dissipating an air charge in the event of a conduit obstruction. In one aspect of this invention, a projectile loading chamber surmounts the gun's handgrip and includes a quick load port through which projectiles are loaded axially into a nozzle fitted to the front of the projectile chamber, also known as the "breech", and terminating in a tapered nipple. A door or port closure member in the breech chamber is spring-biased to a normally closed position over the port. For loading the gun, foam projectiles are pushed through the port closure into a nozzle, with the closure then returning to closed position. The breech chamber as well as the nozzle interior behind the projectile then receive a compressed gas charge when the trigger is pulled. Compressed gas propels the projectile through a conduit, cleaning its interior wall. Another projectile may then be loaded and fired in the same way. The nozzle is mounted in a pivoting breech ring that terminates the projectile chamber so that the chamber may be "broken open" in a manner similar to a double-barrel shotgun for interchange of a range of nozzle and projectile sizes for cleaning conduits in a corresponding range of diameters. In another aspect of this invention, compressed gas flows from a source through the gun's handgrip and through a trigger-actuated air flow control valve into the breech. In the event pressurized air remains in the gun after firing a projectile, by reason of an obstructed conduit, the air pressure is dissipated backwards through the air flow control valve when the operator releases the trigger. The built-up compressed gas is diverted harmlessly through an exhaust circuit opened as the trigger is released. Trigger release also stops further flow of compressed gas into the gun chamber. A shortcoming of the '531 invention is that in operation the apparatus is coupled to the tube to be cleaned solely by forcing the nozzle nipple into the end of the tube and holding it there by operator pressure. Air pressure is maintained until the trigger is released; thus, if the tube is fully blocked, the apparatus may become instantaneously and uncontrollably decoupled from the tube. This arrangement can be effective in shortening the cycle time for cleaning a plurality of tubes, but it requires close attention in operation. Further, the axial breech loading mechanism, including the port closure mechanism, requires a relatively large projectile loading chamber and a concomitantly large gun housing.

What is needed in the art is a) an improved mechanism for loading a projectile into the breech, ready for firing, b) an improved mechanism for positive but simple coupling and uncoupling of the nozzle to the tube to be cleaned.

SUMMARY

The present invention is directed to apparatus for cleaning the interior surface of a tube by pneumatically firing a projectile and/or fluid through the tube. In a currently preferred embodiment, a projectile launching apparatus for cleaning the inner surface of a tube by forcing a projectile through the tube comprises: a main body containing a breech chamber terminating in an exit port, wherein the breech chamber is provided with a loading port in a side thereof for radially loading a projectile into the breech chamber; a slide disposed on an exterior surface of the main body, the slide being axially movable between a first position wherein the loading port is open for loading of a projectile or fluid into the breech chamber and a second position wherein the loading port and the breech chamber are sealed; a gas gun operatively connected to the main body in pneumatic communication with the breech chamber; and an exit nozzle connected to the exit port and being connectable to a first end of the tube to be cleaned. Preferably, apparatus is also provided for catching the launched projectile and/or fluid at the exit end of the tube being cleaned.

BRIEF DESCRIPTION OF DRAWINGS

The present invention will now be described, by way of example, with reference to the accompanying drawings, in which:

FIG. 7 is an isometric view from above of a first embodiment of an exit nozzle assembly in accordance with the present invention;

FIG. 8 is an exploded view of the exit nozzle assembly shown in FIG. 7;

FIG. 9 is a isometric view from above of a second embodiment of an exit nozzle assembly in accordance with the present invention;

DETAILED DESCRIPTION

Figure 1:
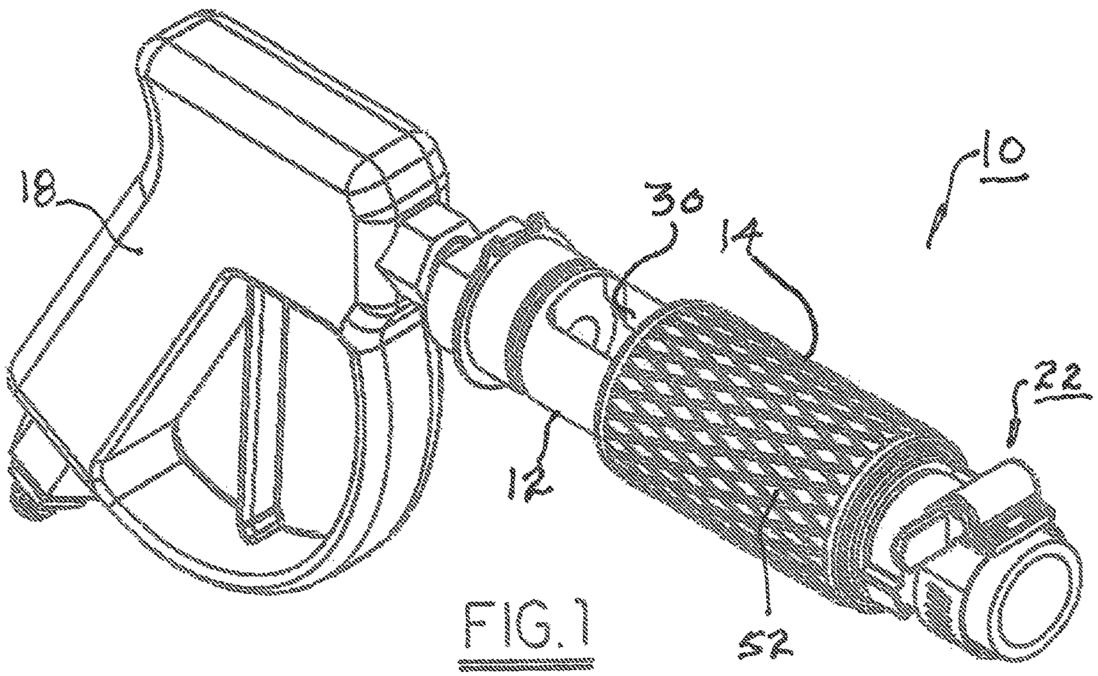
FIG. 1 is an isometric view from above of a projectile launching apparatus in accordance with the present invention, showing the breech chamber open to receive a projectile to be fired.
Figure 2:
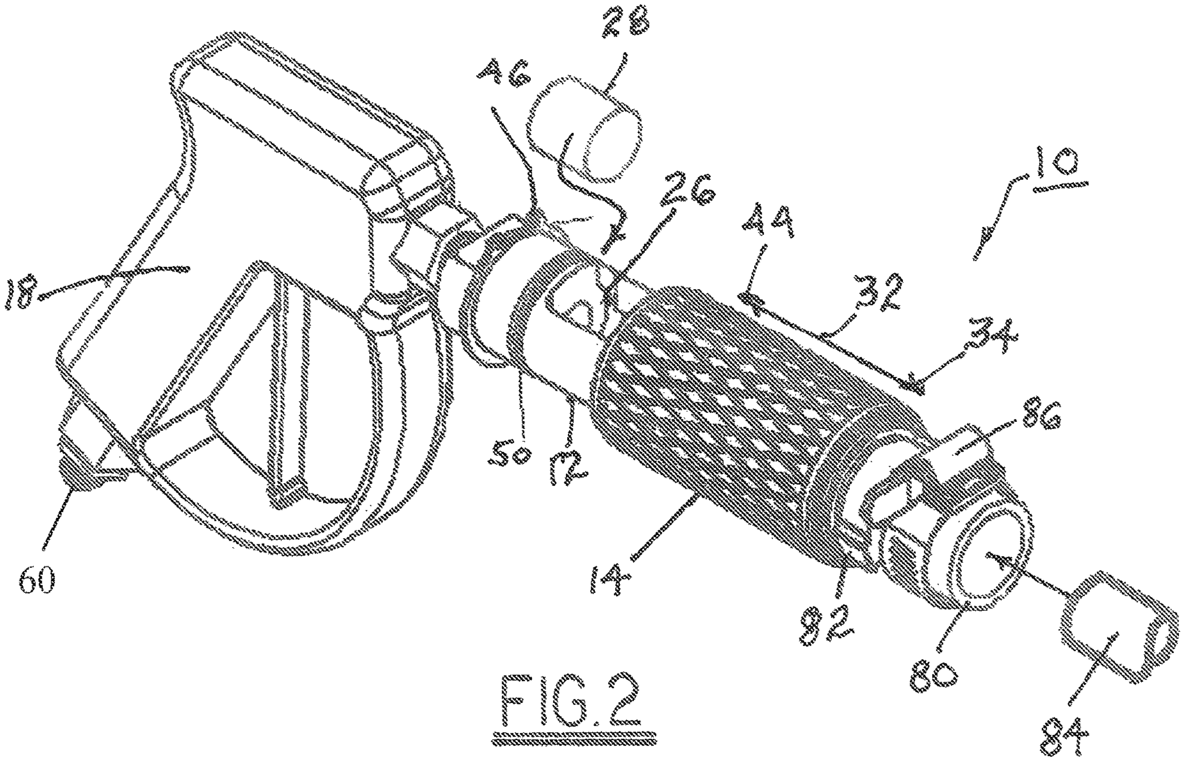
FIG. 2 is an isometric view like that shown in FIG. 1 showing additionally a projectile to be entered into the exposed breech chamber and a tube to be cleaned.
Figure 3:
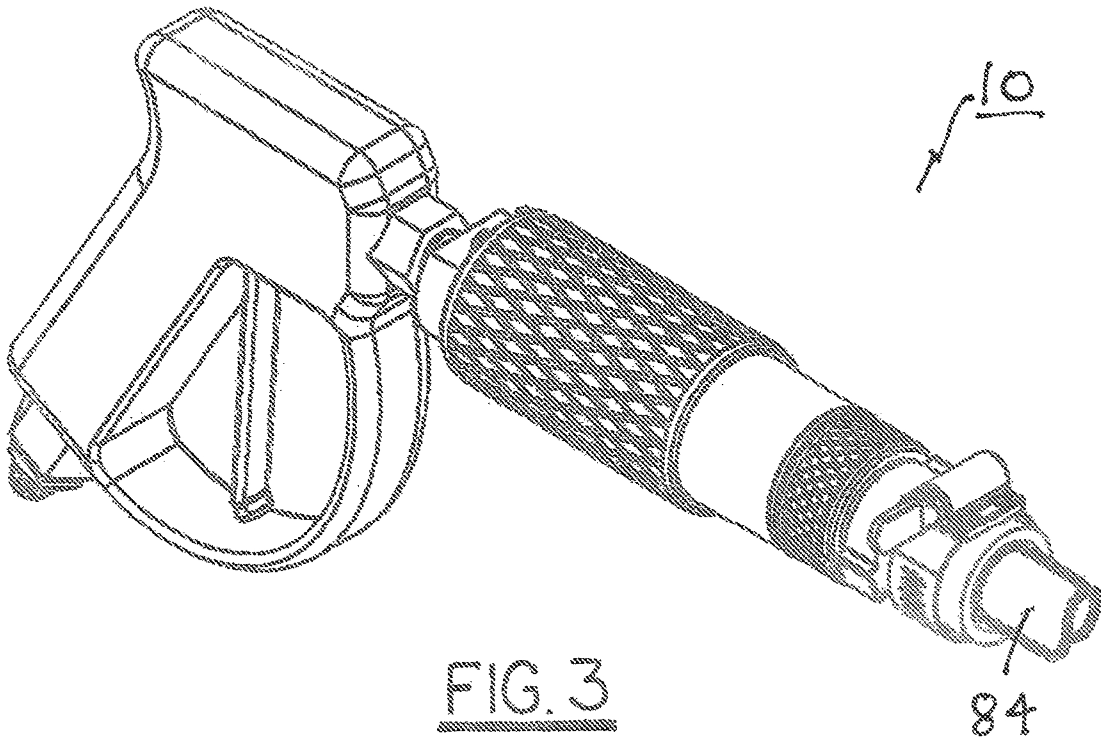
FIG. 3 is an isometric view like that shown in FIG. 1 and FIG. 2, showing the breech chamber closed by the slide and the apparatus connected to the tube to be cleaned.
Figure 4:
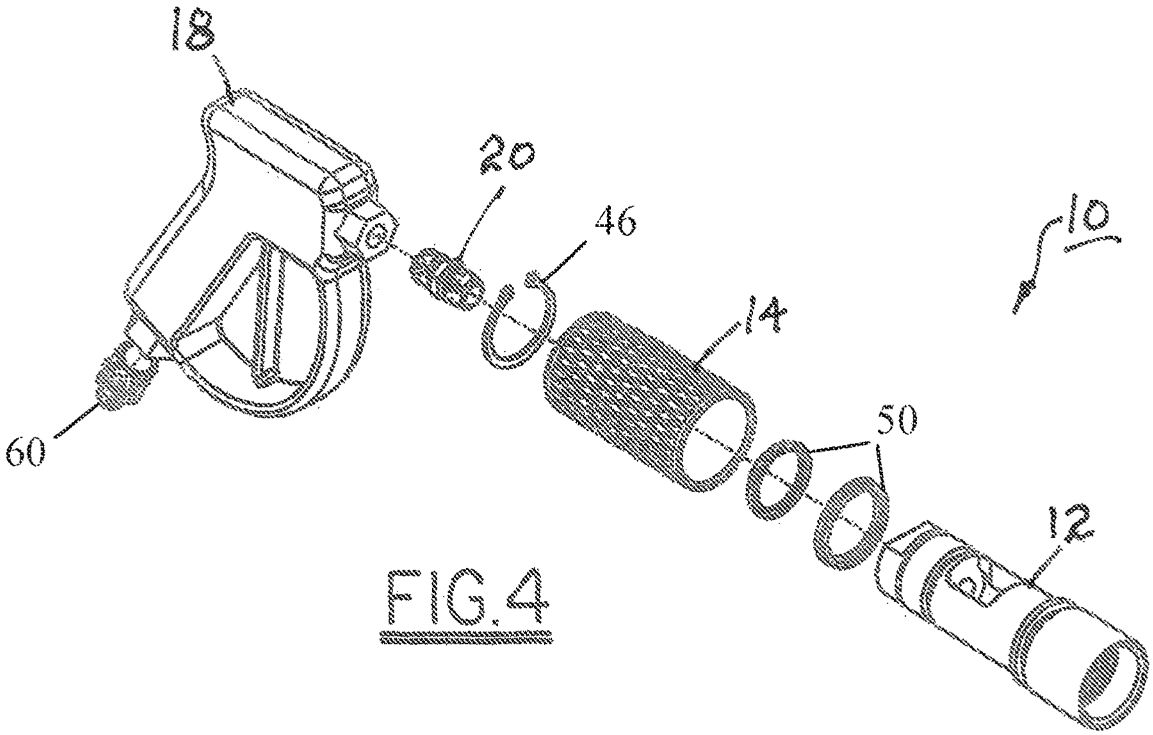
FIG. 4 is an exploded isometric view of the apparatus shown in FIG. 1 and FIG. 2, omitting a hose attachment assembly.
Figure 5:
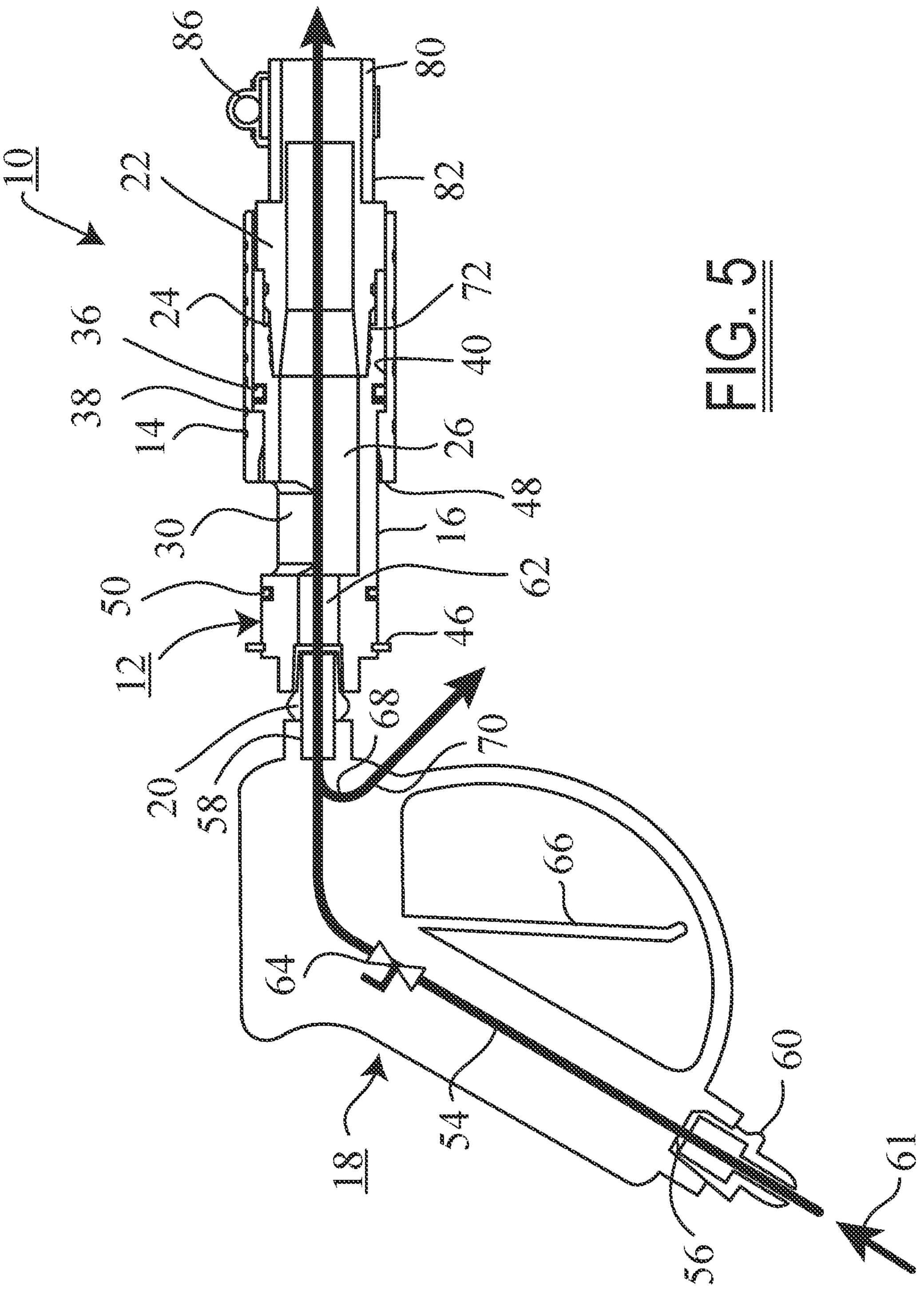
FIG. 5 is a cross-sectional elevational view of a projectile launching apparatus in accordance with the present invention, showing a first embodiment of a gas gun.

Throughout the following description, specific elements are set forth in order to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Further, the term “projectile” as used herein refers generically to any object or material, whether solid, liquid, or gas expelled from the projectile launching apparatus described and claimed hereinbelow.

Referring now to FIGS. 1 through 5, a projectile launching apparatus 10 comprises a main body 12, a slide 14 disposed on an exterior surface 16 of main body 12, a first embodiment of a gas gun 18 operatively connected to main body 12 via a coupling 20, and an exit nozzle 22 connected to main body 12 via an exit port 24 in main body 12. Preferably but not necessarily, main body 12, slide 14, exit nozzle 22, and exit port 24 are cylindrical.

Main body 12 is provided with an internal breech chamber 26, preferably cylindrical, for receiving a projectile 28 to be launched. Projectile 28 is preferably a soft pellet such as a urethane foam sponge. Breech chamber 26 is open to the exterior of main body 12 by a radial loading port 30 whereby projectile 28 may be entered into breech chamber 26.

Slide 14 is preferably a cylinder, close-fitting on its inner bore to main body exterior surface 16. Axial travel 32 of slide 14 is limited in a first direction 34, whereby loading port 30 is uncovered, by a first stop 36 disposed in a first circumferential groove in surface 16 that engages a step 38 formed in the bore 40 of slide 14. Axial travel 32 of slide 14 is limited in a second and opposite direction 44, whereby loading port 30 is covered, by a second stop 46 in the form of a retaining ring disposed in a second circumferential groove in surface 16 that engages an end 48 of slide 14.

First stop 36 is a first U-cup containing an O-ring for sealing the forward end of breech chamber 26 against the inner surface of slide 14; similarly, a second U-cup and O-ring 50 is disposed in a third circumferential groove in surface 16 for sealing the rear end of breech chamber 26 against the inner surface of slide 14. Preferably, the outer surface 52 of slide 14 is knurled to improve the grip by an operator when opening and closing the breech chamber.

A first embodiment of gas gun 18 comprises a housing containing a first passage 54 extending between an inlet port 56 and an outlet port 58. An inlet fitting 60 is disposed in inlet port 56 for connection to a source 61 of compressed gas, e.g., air. Outlet fitting 20 is disposed in outlet port 58 for connecting air gun 18 to breech inlet passage 62 in main body 12. A valve 64, shown schematically in first passage 54, is activated by pivotable trigger 66 to admit compressed gas to breech chamber 26 to fire projectile 26 from projectile launching apparatus 10. In the event that the target tube is plugged against passage of the projectile, back pressure 68 in the tube is relieved via a second passage 70.

Figure 6:
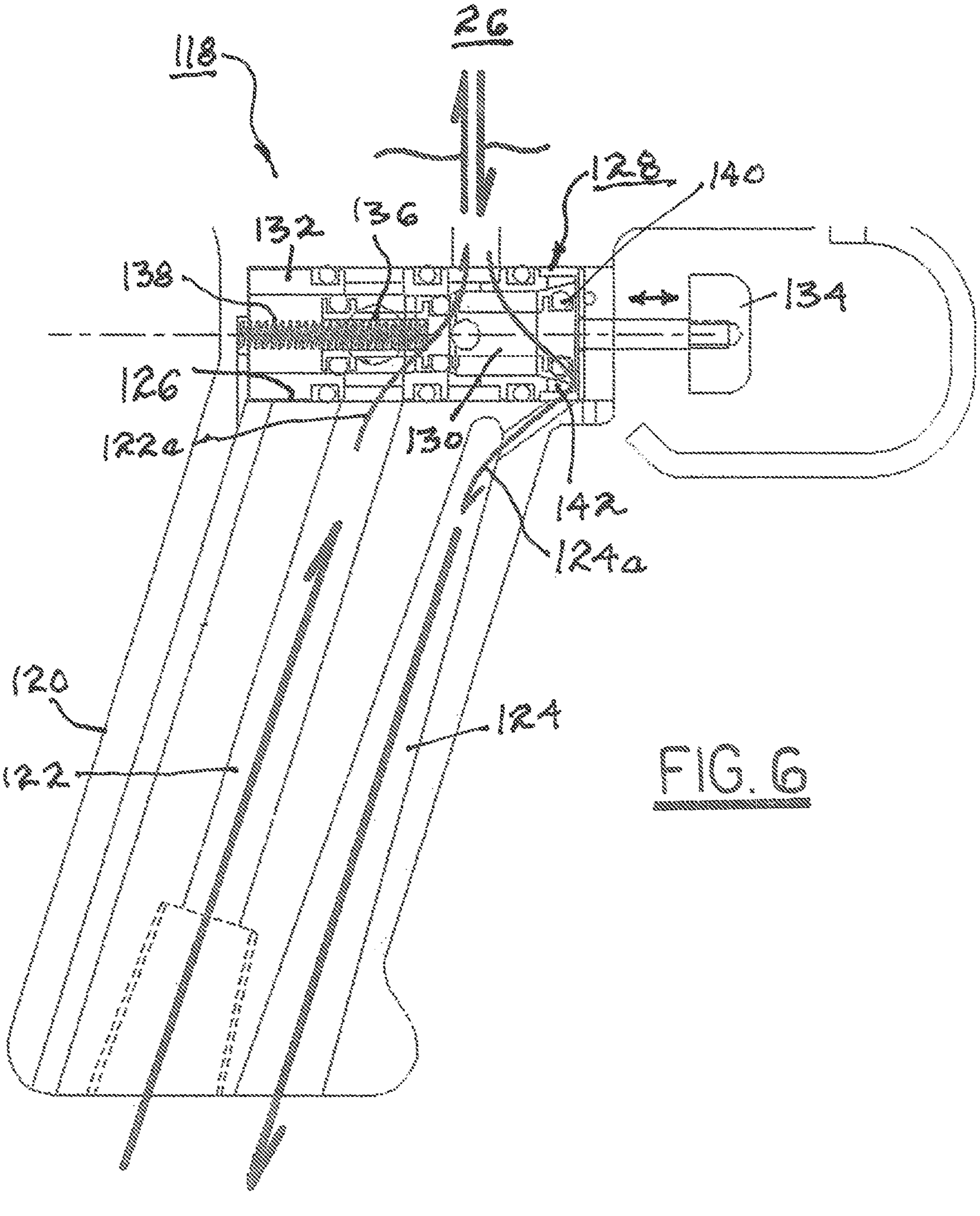
FIG. 6 is a partial cross-sectional elevational view of a second embodiment of a gas in accordance with the present invention, showing first and second passages passing through the trigger mechanism.

Referring now to FIG. 6, a second and currently preferred embodiment of an air gun 118 is substantially as disclosed in incorporated U.S. Pat. No. 6,631,531 BI. Hand grip 120 is provided with a compressed gas supply passage 122 and a pressure relief passage 124, each terminating in a cylindrical valve chamber 126 holding a trigger valve assembly 128 having a valve slide 130 slidably disposed within a valve body 132. Valve slide 130 is actuated by trigger knob 134 to control the flow of air from compressed gas source 61 to breech chamber 26, and, when required, to ambiance. Valve slide 130 is fitted with a spring recess 136 receiving a coil spring 138.

When air flow control valve assembly 128 is in the position shown in FIG. 6, flow of compressed gas from supply passage 122 through the valve is blocked.

When the trigger is pulled (not shown), thereby moving the valve slide to the left in FIG. 6, compressed gas flows (line 122*a*) through the valve interior and into breech chamber 26 to propel a projectile out of the projectile launcher. Simultaneously, O-ring 140 seals the valve interior wall from exhaust port 142. When the trigger is released, spring 138 urges valve slide 130 to return to the rest position shown in FIG. 6, wherein the compressed gas supply is again shut off and exhaust port 142 is opened, allowing return flow (line 124*a*) from breech chamber 26 through the valve interior into exhaust passage 124.

In the event a compressed gas charge propels a projectile into a conduit that is blocked preventing passage of the projectile, the air overpressure existing within breech chamber 26 represents a potentially hazardous situation for an operator. Allowing the chamber pressure to drop to atmospheric ends the potentially dangerous condition.

Referring again to FIGS. 1 through 5, and also 7 through 9, exit nozzle assembly 22 is disposed in exit port 24, preferably via a male/female threaded connection 72 (FIG. 5) or other conventional connecting arrangement (not shown).

In one embodiment, an exit nozzle assembly 22 comprises a nozzle body 74 having preferably a male-threaded end 76 for connection to exit port 24 and a hose-barb end 78 for receiving a hose/coupling 80 secured to hose-barb end 78 by a first hose clamp 82. Preferably, nozzle body 74 has a conical inner surface tapering to a diameter smaller than the diameter of breech chamber 26 such that projectile 28 is radially compressed as it passes through the nozzle body. Projectile launcher 10 is secured to a tube 84 to be cleaned by inserting the entrance end of tube 84 into hose-coupling 80 and tightening second hose clamp 86.

Other conventional arrangements for coupling hose/coupling 80 to exit port 24 and to nozzle body 74, e.g., by compression fittings, screw threads, quick connect, welding, etc., are fully anticipated by the present invention.

In another embodiment 222 of an exit nozzle assembly, with respect to first embodiment 22, hose/coupling 80 and second hose clamp 86 are replaced by a nipple 224 preferably secured to nozzle body 74 by first hose clamp 82, or by any of the attachment arrangements cited hereinabove. Nipple 224 has a terminal end 226 smaller in diameter than the entrance end of tube 84 such that nipple 224 may be sealingly inserted into the entrance end of tube 84 before firing of projectile launcher 10. Preferably, the outer surface 228 of nipple 224 is conically tapered, allowing a single nipple to be used in cleaning a range of tubes having different diameters larger than the diameter of terminal end 226. Preferably, nipple 224 is formed of a soft polymer or elastomer to enhance the seal with tube entrance 84. Additionally, a range of sizes of nipples 224 may be provided as needed to increase the range of tube sizes that may be cleaned.

Figure 11:
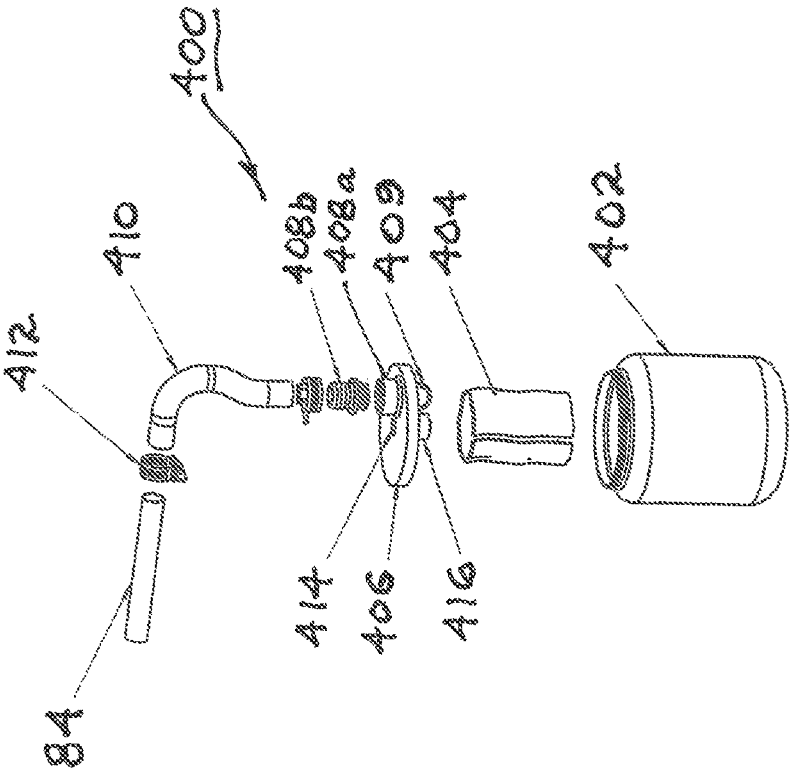
FIG. 11 is an exploded view of a second embodiment of an assembly for arresting a projectile after exiting a cleaned tube.
Figure 10:
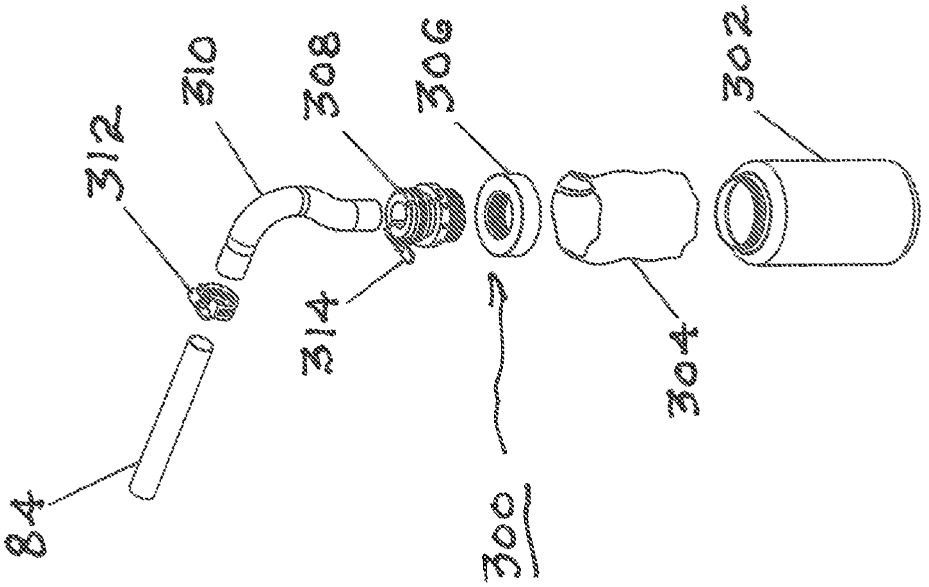
FIG. 10 is an exploded view of a first embodiment of an assembly for arresting a projectile after exiting a cleaned tube.

Referring now to FIGS. 10 and 11, alternative embodiments 300, 400 are shown for catching a projectile and/or fluid and/or debris exiting from tube 84.

Catching embodiment 300 comprises a container 302; optionally an absorbent material such as an oil-absorbent towel 304 disposed in container 302; a threaded container lid 306; a fitting 308 disposed in an opening in lid 306; a hose 310 extending between vented fitting 308 and the exit end of tube 84; and a clamp 312 for securing hose 310 to tube 84. In some applications, hose 310 and clamp may be eliminated and fitting 308 attached directly to the exit end of tube 84. Embodiment 300 includes a vent 314, shown as being an element of fitting 308 but may alternatively be formed in any component of the embodiment.

Catching embodiment 400 comprises a container 402; optionally an absorbent material such as an oil-absorbent towel 404 disposed in container 402; a threaded container lid 406; a fitting having a first part 408*a* disposed in a non-central opening in lid 406 and a second part 408*b* engaging first part 408*a*; a hose 410 extending between fitting 408*b* and the exit end of tube 84; and a clamp 412 for securing hose 410 to tube 84. In some applications, hose 410 and clamp may be eliminated and fitting 408*b* attached directly to the exit end of tube 84. Embodiment 400 includes a vent 414 and vent shield 416, shown as being an element of lid 406 but insertable into any component of the embodiment.

Catching embodiment 400 is distinguished from catching embodiment 300 in that fitting part 408*a* extends through lid 406 and includes an elbow bend 409 that causes the path of material being caught to be turned to enter container 402 substantially tangential to the inner wall thereof.

In operation, inlet fitting 61 is connected to compressed gas source 61, then the entrance end of tube 84 to be cleaned is entered into hose/coupling 80 and clamp 86 is tightened. Slide 14 is moved toward tube 84, thereby exposing loading port 30. A projectile 28 is inserted into breech chamber 26 via loading port 30. Slide 14 is then moved away from tube 84, thereby closing loading port 30. Catching embodiment 300 or 400 is attached to the exit end of tube 84. The projectile launcher is now ready to be fired. The trigger is pulled, discharging the projectile into and through tube 84 into catching embodiment 300 or 400. The catching container 302/402 is unscrewed from its respective cap 306/406, and the captured material is discarded.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A method, comprising:

causing a user to access an apparatus, wherein the apparatus includes a body, a slide, and a gas gun, wherein the body includes a first end portion and a second end portion, wherein the first end portion is configured for connecting to the gas gun, wherein the second end portion is configured for connecting a tube end portion, wherein the body includes a breech chamber extending between the first end portion and the second end portion, wherein the breech chamber includes a port extending between the first end portion and the second end portion, wherein the slide is configured for moving over the body external to the breech chamber between the first end portion and the second end portion such that the slide is configured to move between an open position and a closed position, wherein the open position has the port uncovered via the slide, wherein the closed position has the port covered via the slide, wherein the breech chamber terminates at an exit port, wherein the second end portion includes an exit nozzle connected to the exit port, wherein the exit nozzle comprises a nozzle body having a threaded end connected to the exit port and a hose-barb end, wherein (i) a hose-coupling is secured to the hose-barb end by a first hose clamp to have the second end portion connect to the tube end portion by inserting the tube end portion into the hose-coupling and tightening a second hose clamp or (ii) a nipple is secured to the hose-barb end by a first hose clamp, wherein the nipple has a terminal end smaller in diameter than the tube end portion such that the nipple is sealingly insertable into the tube end portion before activating the gas gun; and enabling the user to:

couple the second end portion to the tube end portion;

insert a projectile into the breech chamber via the port based on the slide being in the open position;

move the slide from the open position to the closed position; and activate the gas gun based on the body extending between the gas gun and the tube end portion while the first end portion is connected to the gas gun such that the projectile moves from the breech chamber into the tube end portion while the slide is in the closed position.

2. The method of claim 1, wherein the port extends between the gas gun and the slide based on the slide being in the open position.

3. The method of claim 1, wherein each of the body and the slide is cylindrical.

4. The method of claim 1, wherein the projectile is a foam pellet.

5. The method of claim 1, wherein the tube end portion is a first tube end portion, and further comprising:

enabling the user to:

receive the projectile from a second tube end portion in a container, wherein the second tube end portion is distal to the first tube end portion.

6. The method of claim 5, wherein the container includes a sidewall through which the projectile is received.

7. The method of claim 5, wherein the container contains an absorbent material.

8. The method of claim 7, wherein the absorbent material is oil-absorbent.

9. The method of claim 1, wherein the hose-coupling is secured to the hose-barb end by the first hose clamp to have the second end portion connect to the tube end portion by inserting the tube end portion into the hose-coupling and tightening the second hose clamp.

10. The method of claim 1, wherein the nipple is secured to the hose-barb end by the first hose clamp, wherein the nipple has the terminal end smaller in diameter than the tube end portion such that the nipple is sealingly insertable into the tube end portion before activating the gas gun.

11. An apparatus, comprising:

a gas gun;

a body including a first end portion and a second end portion, wherein the first end portion is configured for connecting to the gas gun, wherein the second end portion is configured for connecting a tube end portion, wherein the body includes a breech chamber extending between the first end portion and the second end portion, wherein the breech chamber includes a port extending between the first end portion and the second end portion; and a slide configured for moving over the body external to the breech chamber between the first end portion and the second end portion such that the slide is configured to move between an open position and a closed position, wherein the open position has the port uncovered via the slide, wherein the closed position has the port covered via the slide, wherein the breech chamber terminates at an exit port, wherein the second end portion includes an exit nozzle connected to the exit port, wherein the exit nozzle comprises a nozzle body having a threaded end connected to the exit port and a hose-barb end, wherein (i) a hose-coupling is secured to the hose-barb end by a first hose clamp to have the second end portion connect to the tube end portion by inserting the tube end portion into the hose-coupling and tightening a second hose clamp or (ii) a nipple is secured to the hose-barb end by a first hose clamp, wherein the nipple has a terminal end smaller in diameter than the tube end portion such that the nipple is sealingly insertable into the tube end portion before activating the gas gun, wherein a projectile is configured to be moved from the breech chamber into the tube end portion while the slide is in the closed position after the second end portion is coupled to the tube end portion, the projectile is inserted into the breech chamber via the port based on the slide being in the open position, the slide is moved from the open position to the closed position, and the gas gun is activated based on the body extending between the gas gun and the tube end portion while the first end portion is connected to the gas gun.

12. The apparatus of claim 11, wherein the port extends between the gas gun and the slide based on the slide being in the open position.

13. The apparatus of claim 11, wherein each of the body and the slide is cylindrical.

14. The apparatus of claim 11, wherein the projectile is a foam pellet.

15. The apparatus of claim 11, wherein the tube end portion is a first tube end portion, and further comprising:

a second tube end portion in a container, wherein the second tube end portion is distal to the first tube end portion.

16. The apparatus of claim 15, wherein the container includes a sidewall through which the projectile is received.

17. The apparatus of claim 15, wherein the container contains an absorbent material.

18. The apparatus of claim 11, wherein the hose-coupling is secured to the hose-barb end by the first hose clamp to have the second end portion connect to the tube end portion by inserting the tube end portion into the hose-coupling and tightening the second hose clamp.

19. The apparatus of claim 11, wherein the nipple is secured to the hose-barb end by the first hose clamp, wherein the nipple has the terminal end smaller in diameter than the tube end portion such that the nipple is sealingly insertable into the tube end portion before activating the gas gun.

* * * * *